Figure 16:
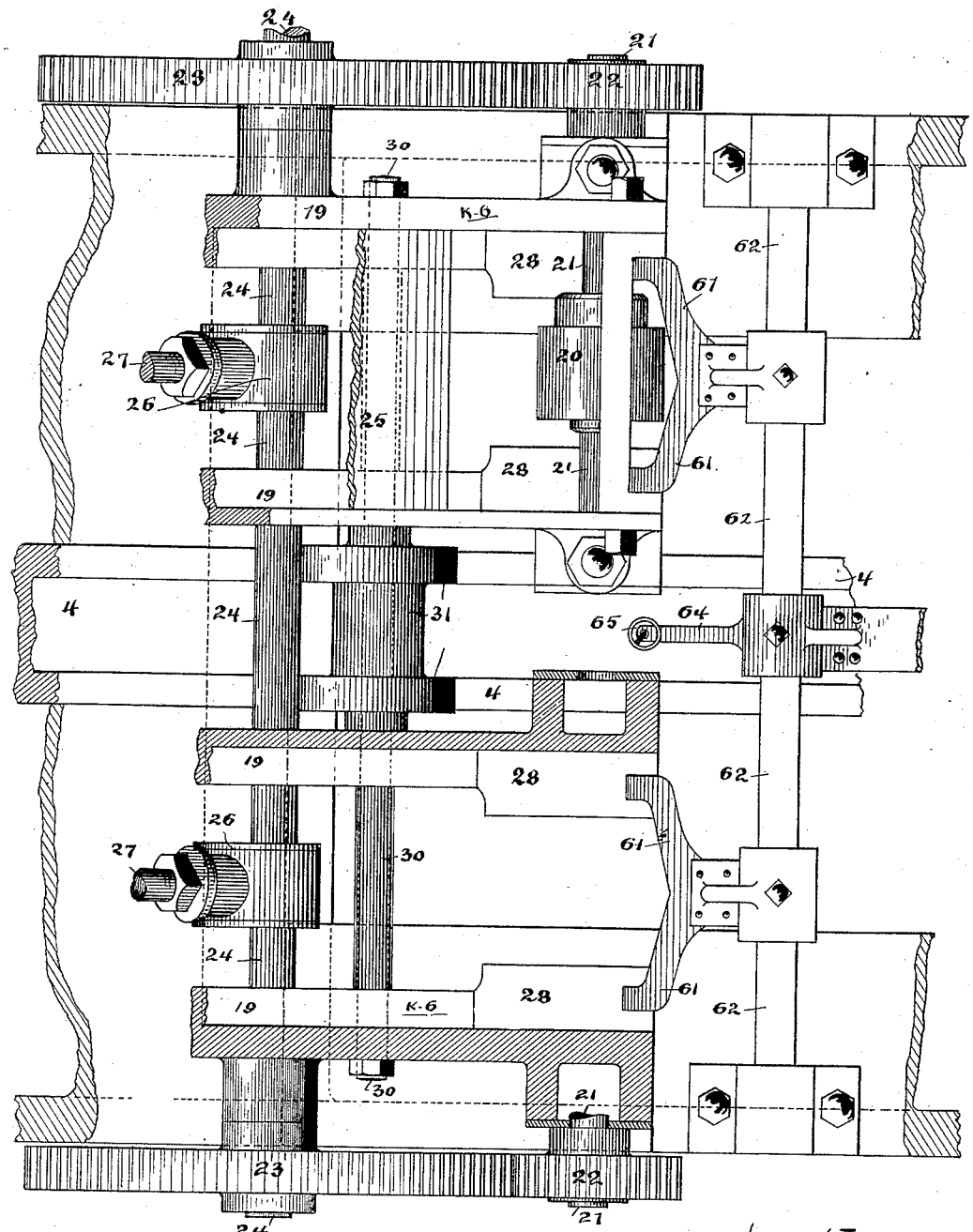

(No Model.)   14 Sheets—Sheet 1.
M. M. ZELLERS & J. W. DENMEAD.
MATCH MACHINE.
No. 436,470.   Patented Sept. 16, 1890.
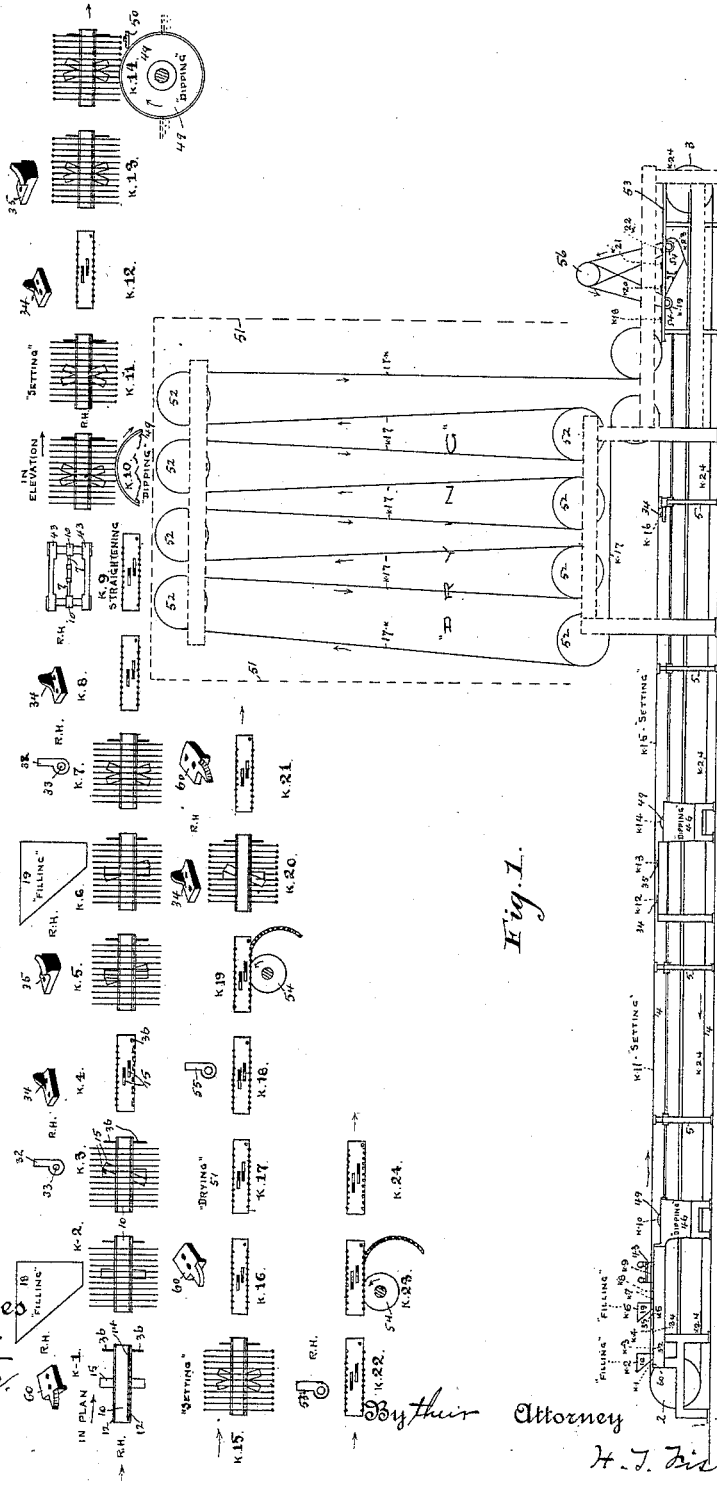

(No Model.) 14 Sheets—Sheet 2.
M. M. ZELLERS & J. W. DENMEAD.
MATCH MACHINE.
No. 436,470. Patented Sept. 16, 1890.
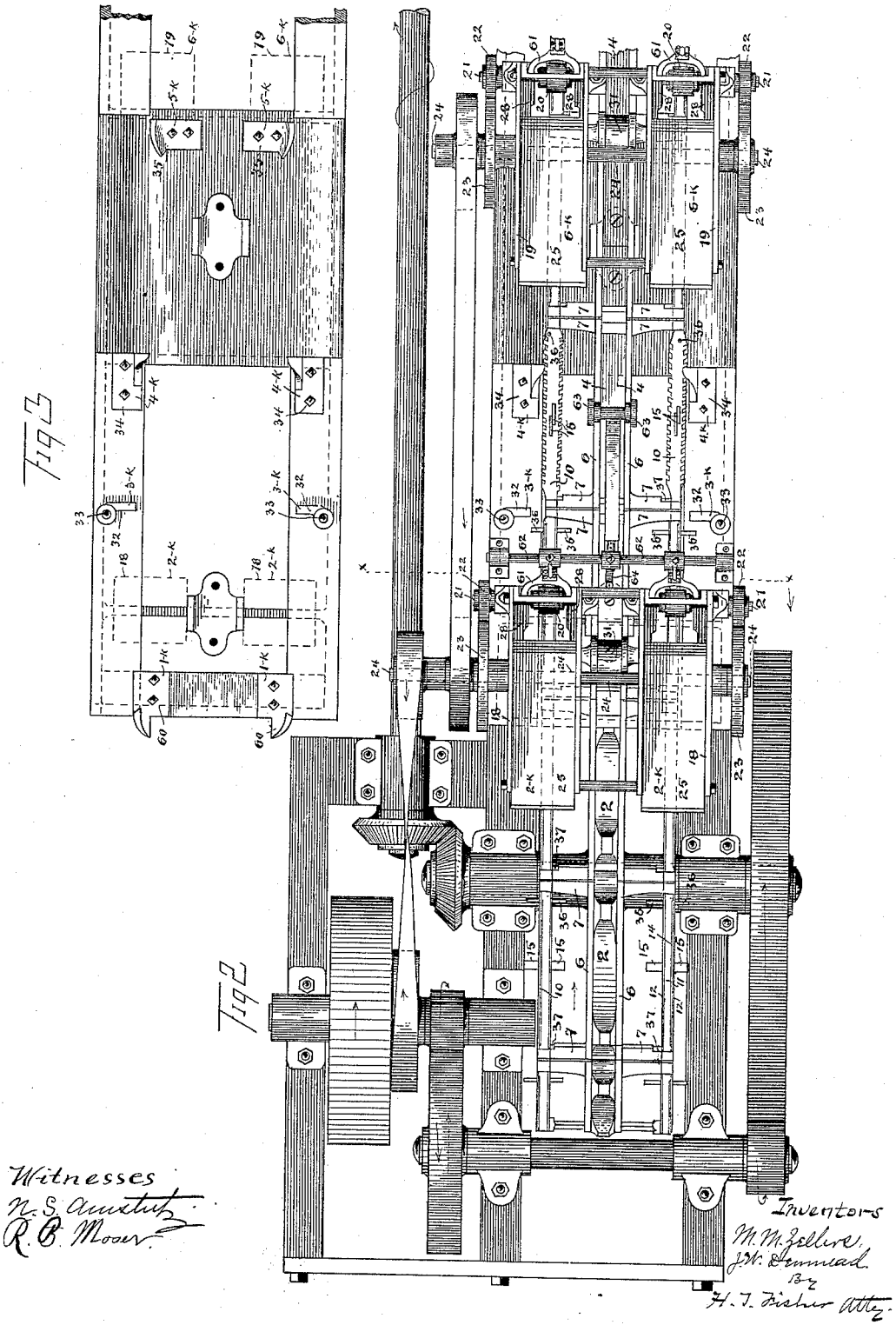

(No Model.) 14 Sheets—Sheet 3.
M. M. ZELLERS & J. W. DENMEAD.
MATCH MACHINE.
No. 436,470. Patented Sept. 16, 1890.
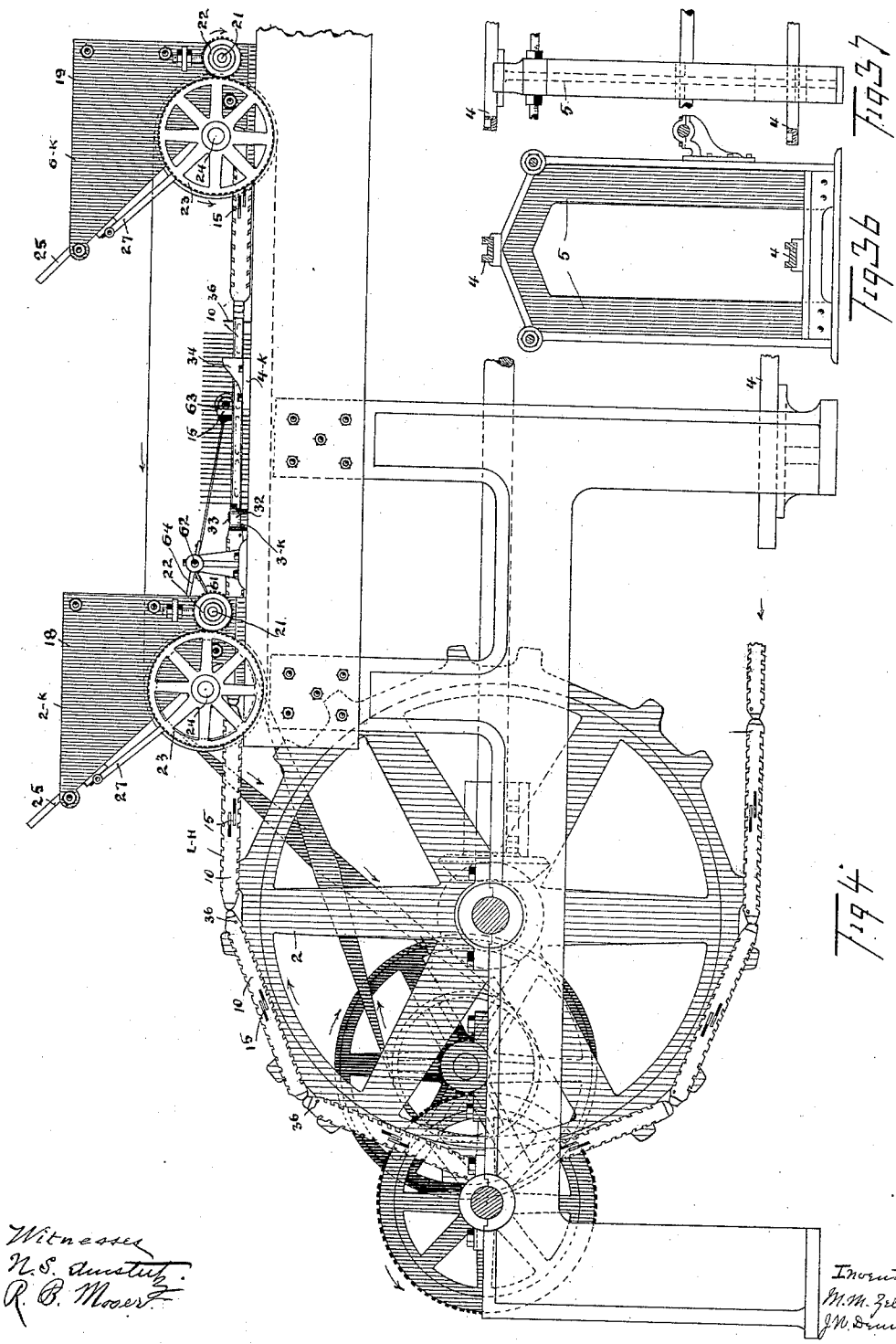

(No Model.) 14 Sheets—Sheet 4.
M. M. ZELLERS & J. W. DENMEAD.
MATCH MACHINE.
No. 436,470. Patented Sept. 16, 1890.
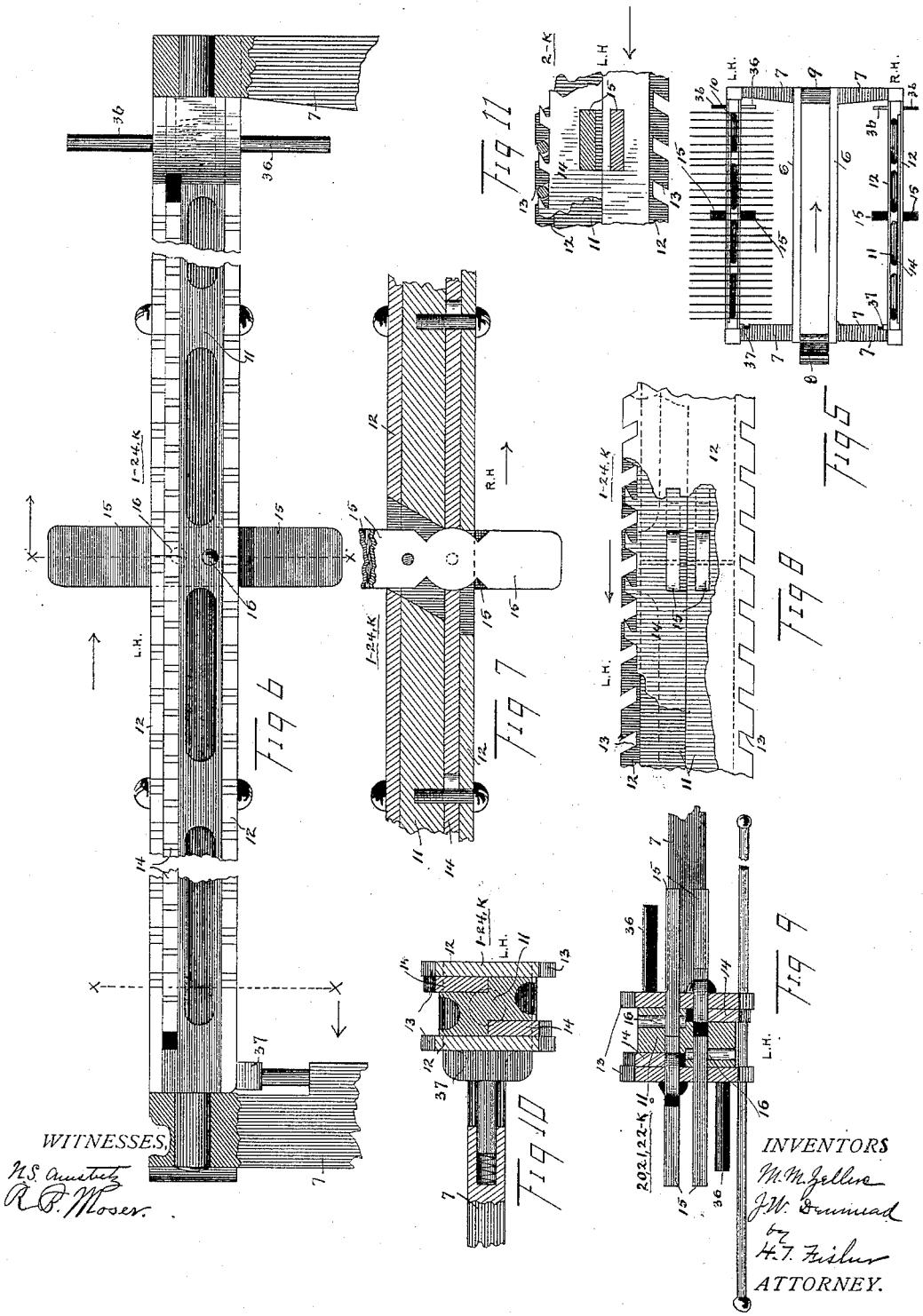
WITNESSES,
INVENTORS
ATTORNEY.

(No Model.) 14 Sheets—Sheet 5.
M. M. ZELLERS & J. W. DENMEAD.
MATCH MACHINE.
No. 436,470. Patented Sept. 16, 1890.
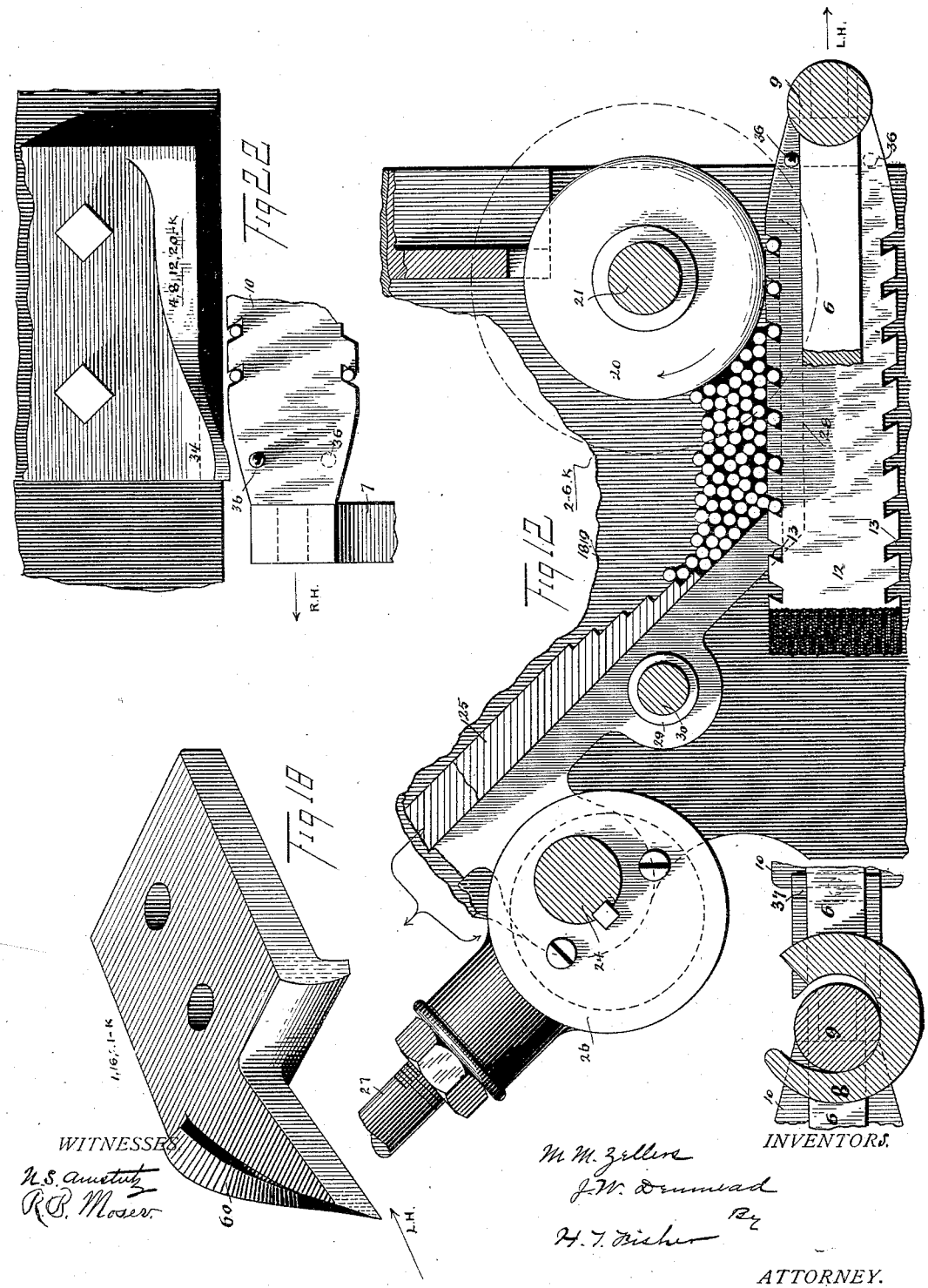
WITNESSES
INVENTORS
M. M. Zellers
J. W. Denmead
H. T. Fisher
ATTORNEY.

(No Model.) 14 Sheets—Sheet 6.
M. M. ZELLERS & J. W. DENMEAD.
MATCH MACHINE.
No. 436,470. Patented Sept. 16, 1890.
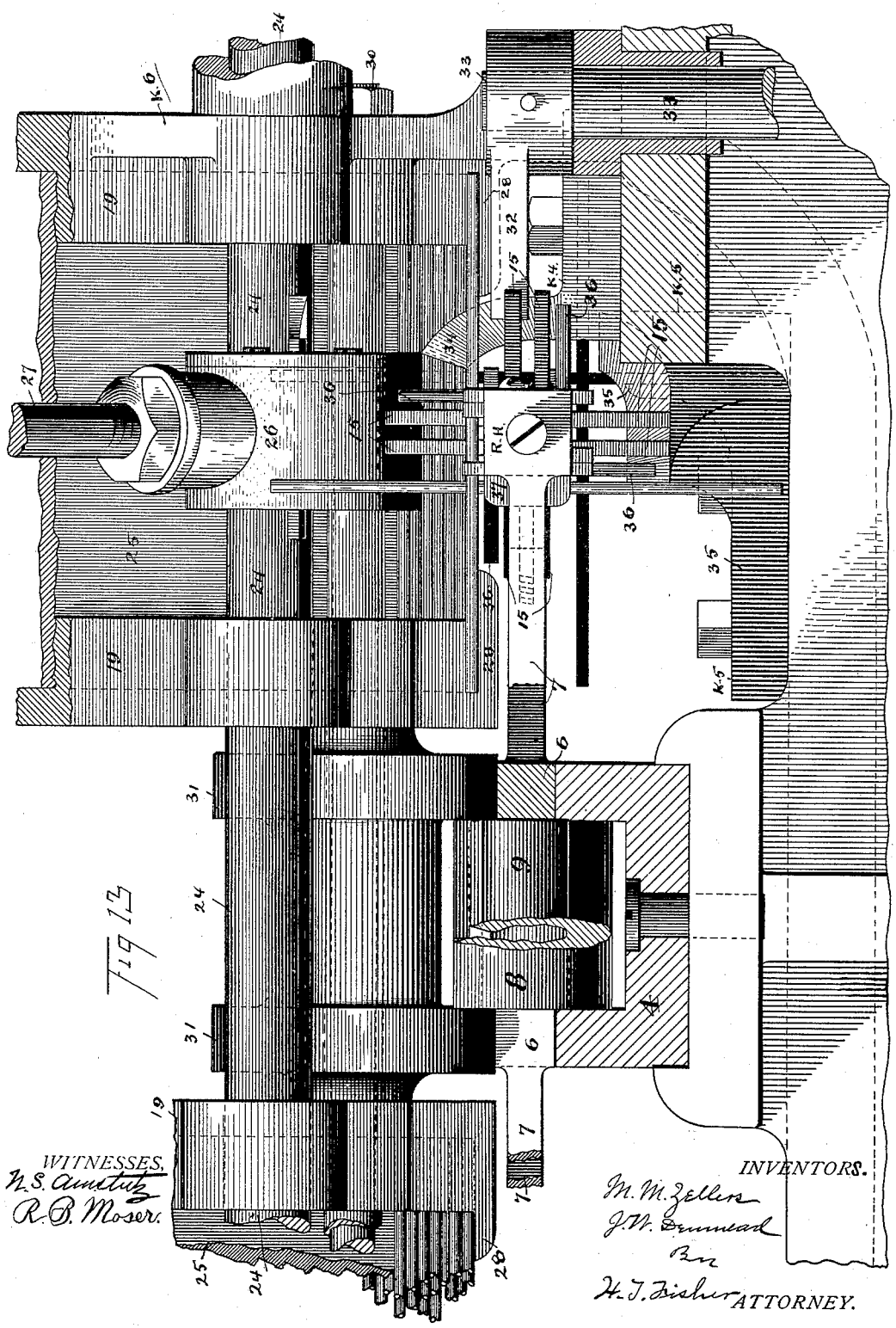
WITNESSES.
N. S. Amstutz
R. B. Moser.
INVENTORS.
M. M. Zellers
J. W. Denmead
By
H. J. Fisher ATTORNEY.

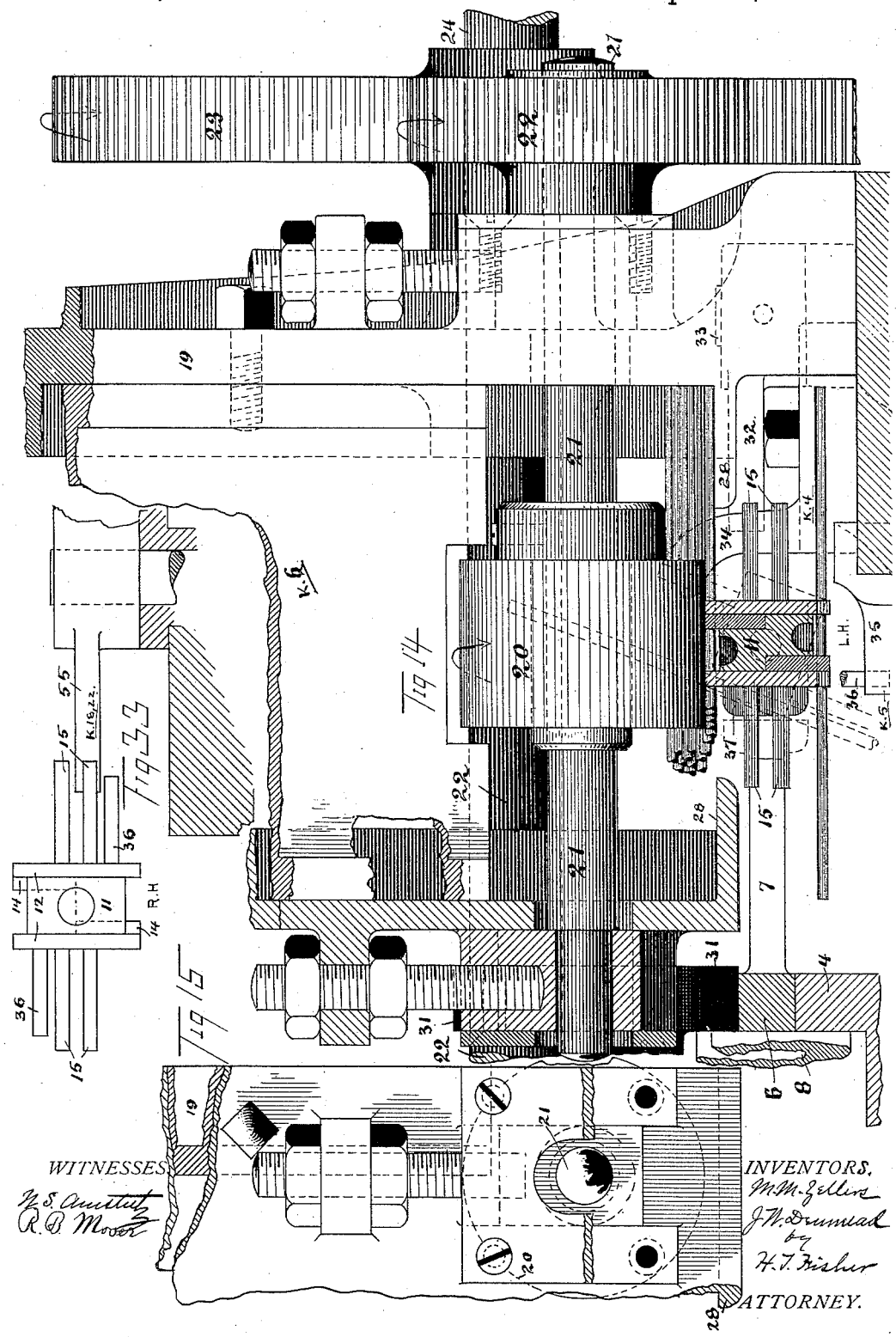
(No Model.) 14 Sheets—Sheet 7.
M. M. ZELLERS & J. W. DENMEAD.
MATCH MACHINE.
No. 436,470. Patented Sept. 16, 1890.

(No Model.) 14 Sheets—Sheet 8.

M. M. ZELLERS & J. W. DENMEAD.
MATCH MACHINE.

No. 436,470. Patented Sept. 16, 1890.

Witnesses
N. S. Amstutz
R. B. Moser

Inventors
M. M. Zellers
J. W. Denmead
by H. T. Fisher atty.

(No Model.) 14 Sheets—Sheet 9.
M. M. ZELLERS & J. W. DENMEAD.
MATCH MACHINE.
No. 436,470. Patented Sept. 16, 1890.
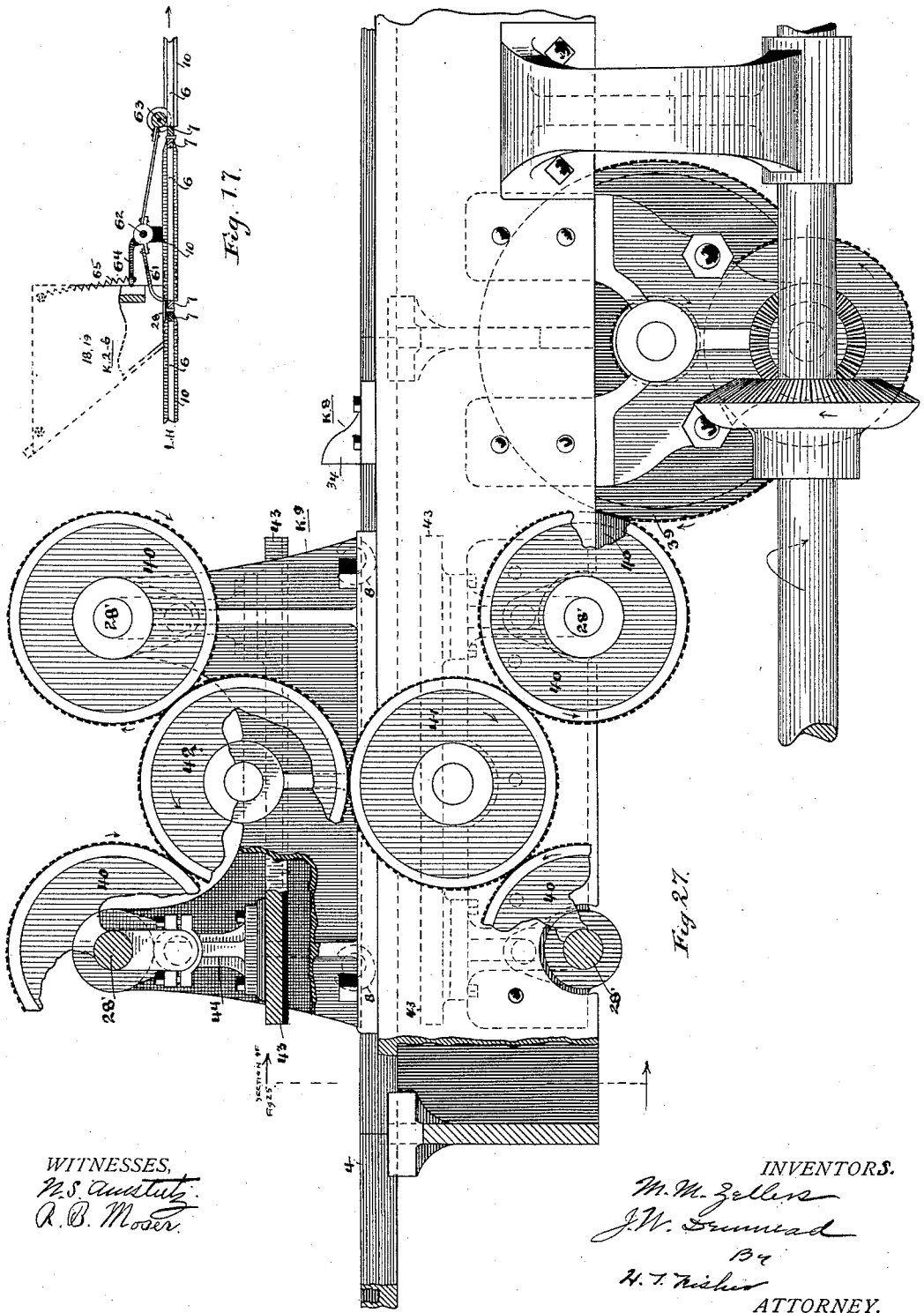
WITNESSES,
INVENTORS.
ATTORNEY.

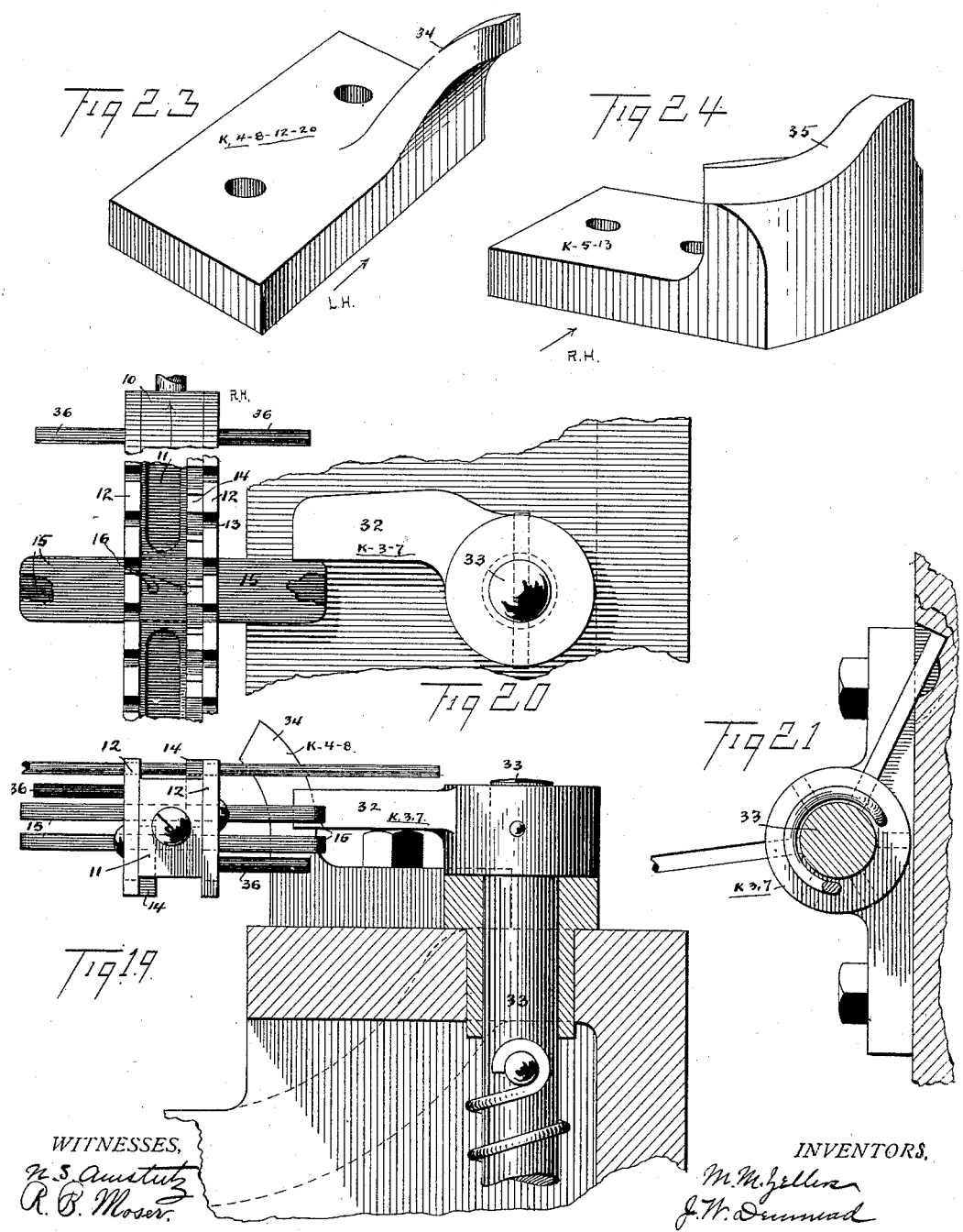

(No Model.) 14 Sheets—Sheet 11.
M. M. ZELLERS & J. W. DENMEAD.
MATCH MACHINE.
No. 436,470. Patented Sept. 16, 1890.
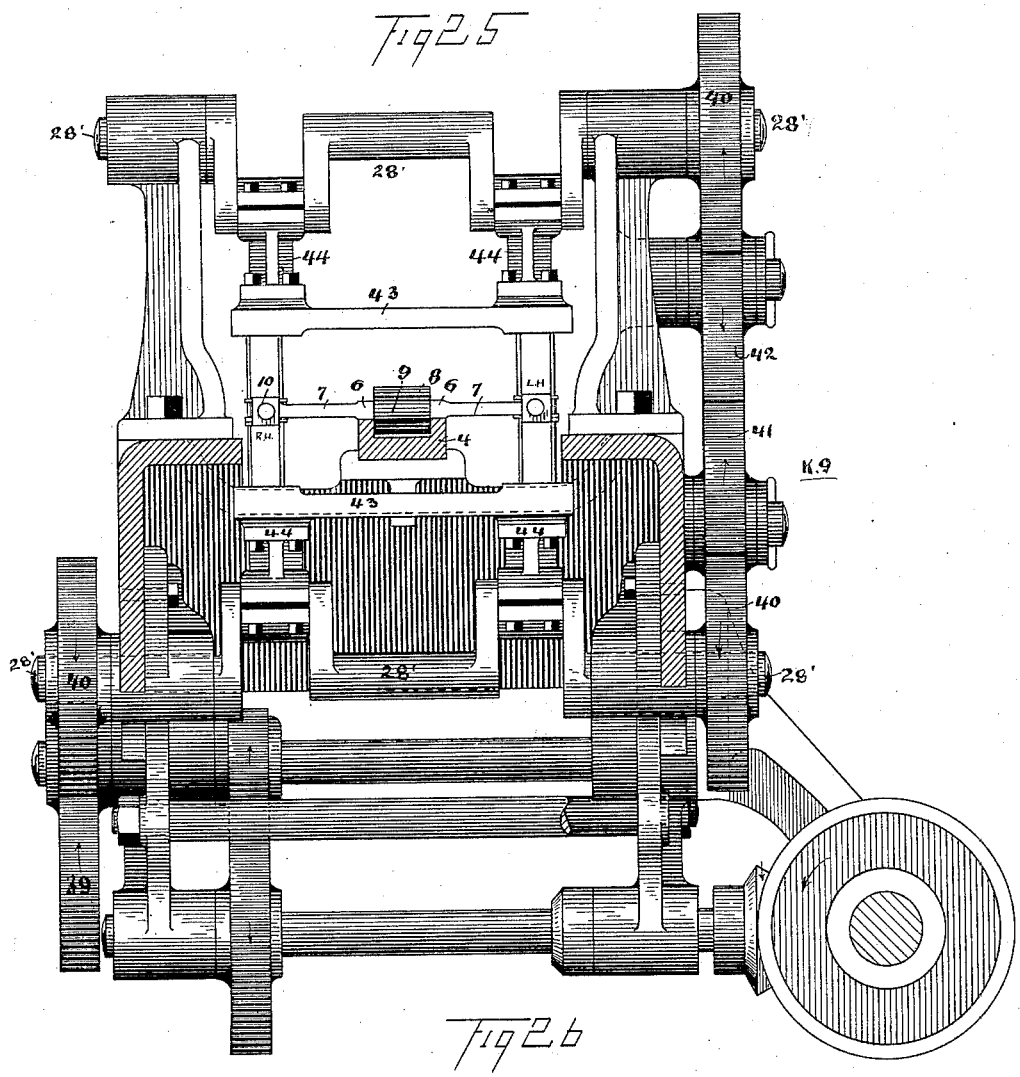
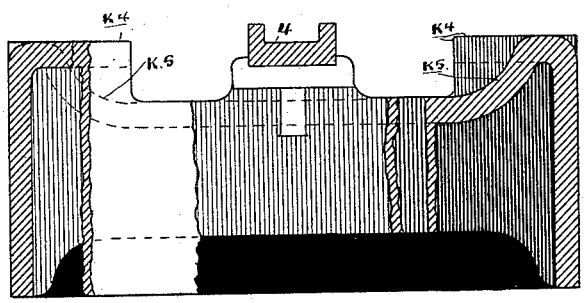

(No Model.) 14 Sheets—Sheet 12.
M. M. ZELLERS & J. W. DENMEAD.
MATCH MACHINE.
No. 436,470. Patented Sept. 16, 1890.
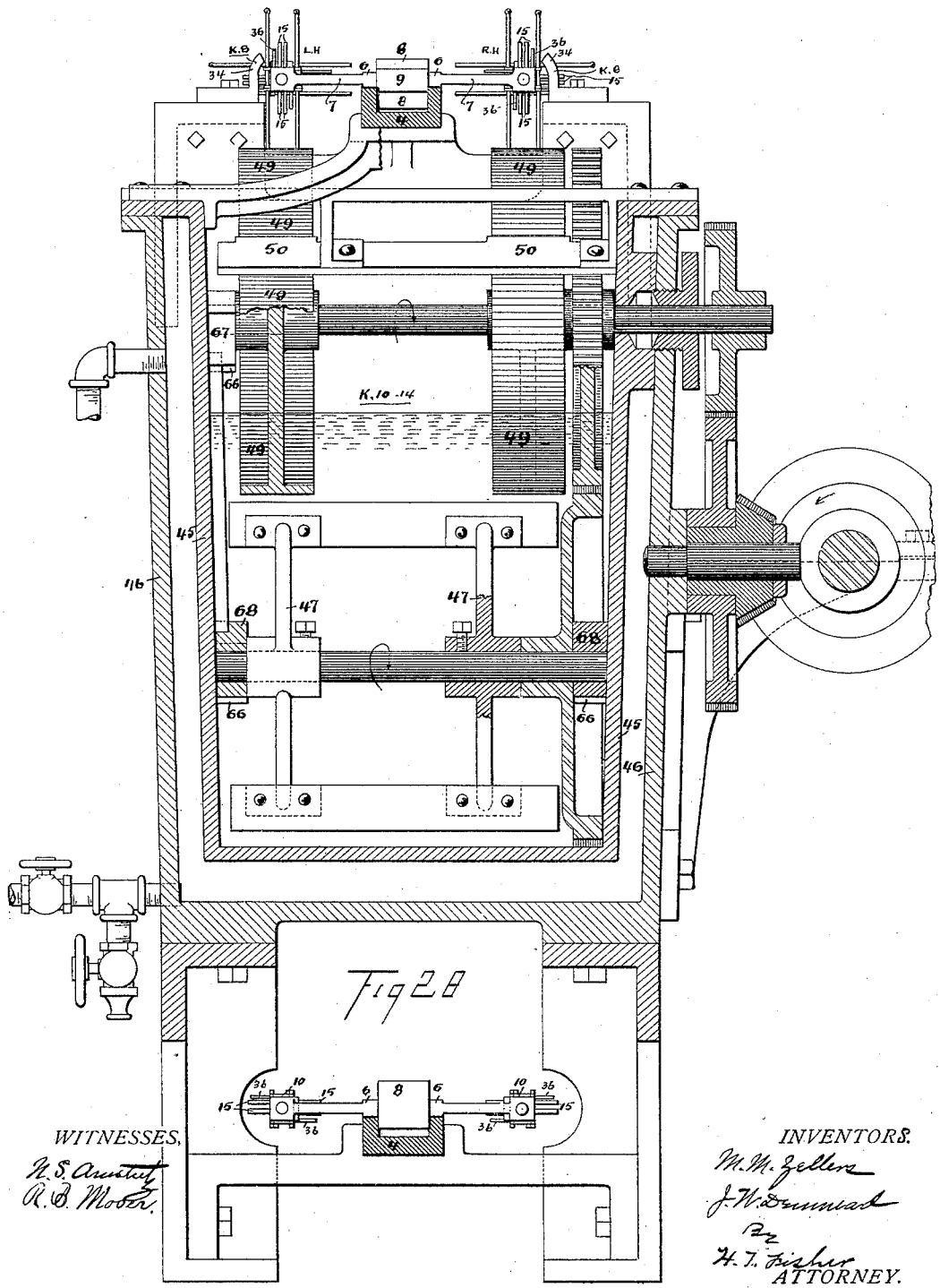
WITNESSES,
INVENTORS.
ATTORNEY.

(No Model.) 14 Sheets—Sheet 13.
M. M. ZELLERS & J. W. DENMEAD.
MATCH MACHINE.
No. 436,470. Patented Sept. 16, 1890.
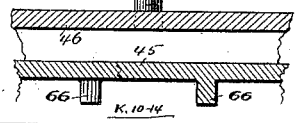
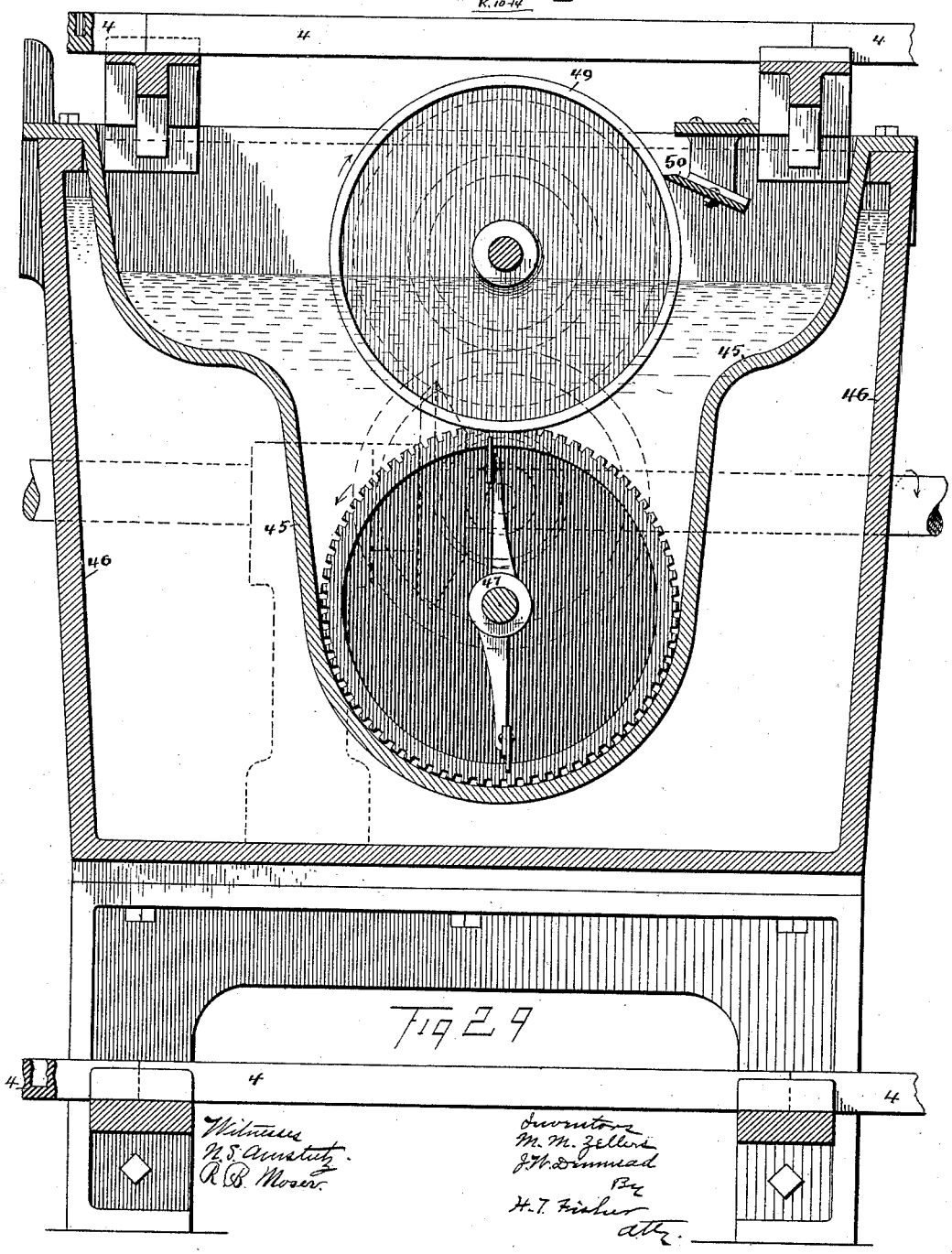

(No Model.) 14 Sheets—Sheet 14.
M. M. ZELLERS & J. W. DENMEAD.
MATCH MACHINE.
No. 436,470. Patented Sept. 16, 1890.
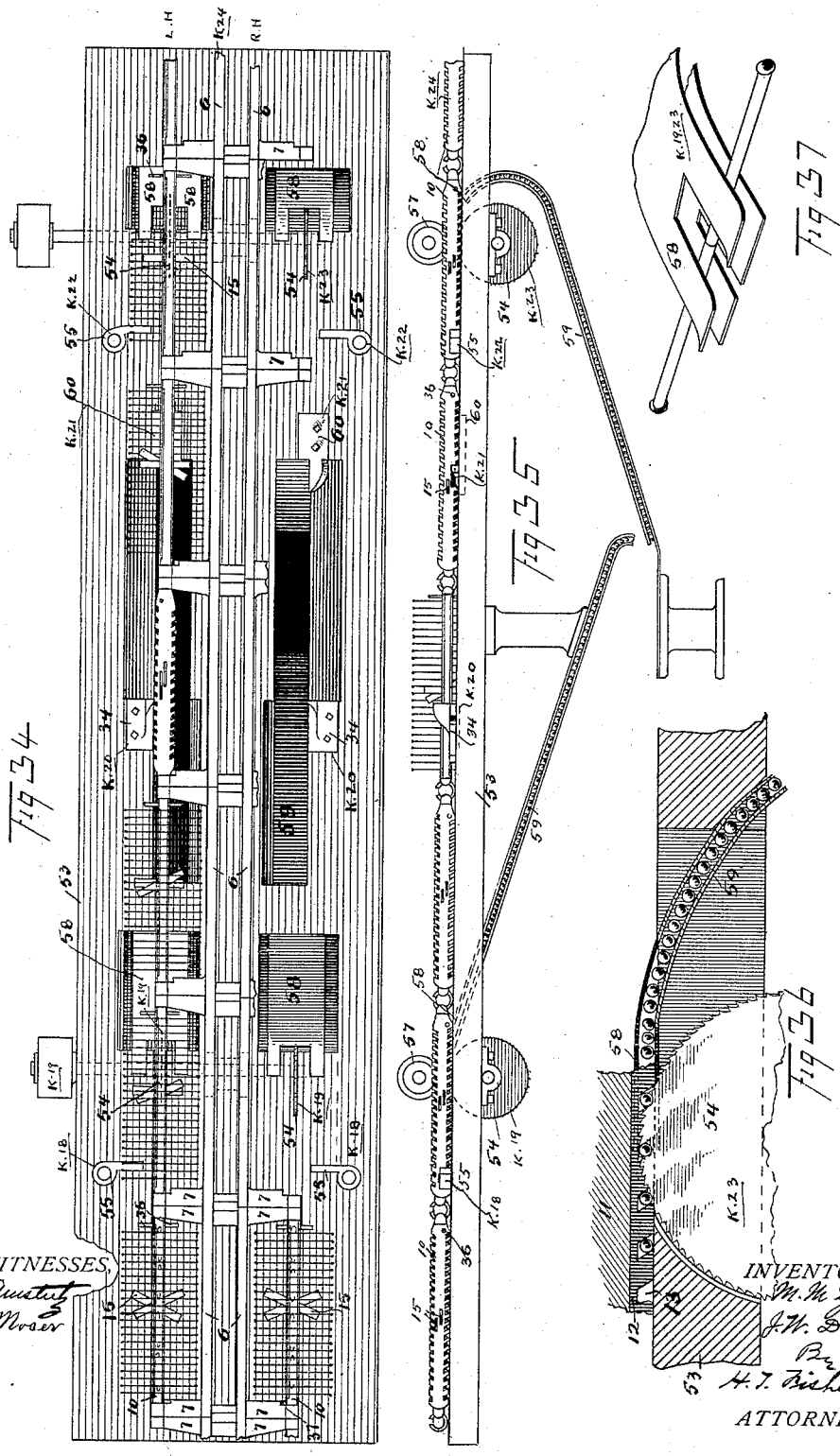

UNITED STATES PATENT OFFICE.

MAHLON M. ZELLERS AND JOHN W. DENMEAD, OF AKRON, OHIO.

MATCH-MACHINE.

SPECIFICATION forming part of Letters Patent No. 436,470, dated September 16, 1890.

Application filed November 23, 1889. Serial No. 331,339. (No model.)

*To all whom it may concern:*

Be it known that we, MAHLON M. ZELLERS and JOHN W. DENMEAD, citizens of the United States, residing at Akron, in the county of Summit and State of Ohio, have invented certain new and useful Improvements in Match-Machines; and we do hereby declare that the following is a full, clear, and exact description of the invention, which will enable others skilled in the art to which it appertains to make and use the same.

Our invention relates to the manufacture of matches; and the invention consists in the construction, combination, and arrangement of parts, substantially as shown and described, and particularly pointed out in the claims.

In the accompanying drawings, Figure 1 is a side elevation of a machine embodying our invention, but necessarily on so small a scale that the figure serves only to show the location of the more prominent parts of the machine, leaving the construction of the parts and elements to be disclosed in the other and more enlarged views. Fig. 2 is a plan view of the front portion of the machine as far as the second set of hoppers, and Fig. 3 a plan view of the frame beneath the two sets of hoppers, showing the cams for turning the splint-bars and the catches by which the plates are locked on the splints. Fig. 4 is a side elevation of the same portion of the machine shown in Fig. 2, broken off just beyond the second set of hoppers. Fig. 5, Sheet 4, is a plan view of one of the many links composing the endless carrier-chain, showing the two splint carrier-bars with which each link is provided and one of said bars loaded with splints. The letters L H and R H appear in this and subsequent figures showing the splint-bars, and mean left hand and right hand, respectively. These bars always turn inward, and are alike, except in the location of the pins at one end by or through which they are turned. These pins are on different planes, Fig. 9, and by reason of this single difference the bars are adapted to the right and left hand sides of the links. Fig. 6, Sheet 4, is a full-sized plan view of one of the L H splint-bars, broken at two points to bring it within the sheet. Its real length is about thirteen inches, but may be shorter or longer. Fig. 7 is a horizontal section of the central portion of one of the splint-bars, showing the transverse locking-lever and the slot in which the lever works to effect the locking or unlocking of the splints through the toothed locking-plate at one side. Fig. 8 is a side elevation of the central portion of one of the splint-bars, showing it unlocked on both sides and the relation of the holding and locking teeth to one another when in this position, the two sets of teeth being side by side. Fig. 9 is a cross-section of a splint-bar on the line of the locking-levers, showing the relation of said lever to another and the bar and the toothed locking-plates therein at diagonal corners, the position and relation of the engaging pins on the sides, and a part of an end cross-bar of the link in the background at the right. The lower side of the bar is loaded with splints. Fig. 10 is a cross-section of the said bar on line $x\,x$, Fig. 6, showing the spring-pressed push-bolt at the angle of the link as it bears against the bar and completes the turning thereof when the cams have spent their work, as well as by bearing against the flat side of the bar, always holding it in proper working position, whether the splints be vertical or horizontal. Fig. 11 is a side view of a section of the splint-bar, a part being broken away to show how the locking-teeth engage the splints shown in upper part of view. Fig. 12, Sheet 5, is an enlarged vertical longitudinal section of one of the hoppers, Figs. 2 and 4, showing especially the manner in which the splints feed into the bars. Fig. 13, Sheet 7, is a cross-section of the machine just in front of the first set of hoppers about on line $x\,x$, Fig. 2, Sheet 2, the parts at the left of the view not being fully shown and showing a view looking toward the second set of hoppers. Fig. 14, Sheet 8, is a cross-section in front of one of the hoppers and looking back toward the hopper, and Fig. 15 is a side view of the housing shown in section at the left of the adjacent Fig. 14. Fig. 16, Sheet 9, is a plan view of, say, the second set of hoppers with the hoppers broken away here and there to show features not otherwise visible. Fig. 17, Sheet 11, is a side view of a hopper and the automatic mechanism employed to bridge over the space between links or splint bars and prevent feeding of splints till a bar moves up into position to be filled. This completes the line of views relating more especially to the hopper and link mechanism. Fig. 18, Sheet 5, is an enlarged detail in perspective of one of the carriers employed to turn the splint-bars, which have a full quarter-turn and no more each time. Fig. 19 is a side view of one of the pivoted spring-pressed locking-catches located after each hopper, which engage the end of the locking-levers in the splint-bars and lock the splints after the bars have been filled and before turning. Fig. 20 is a plan view of Fig. 19. Fig. 21 is a view looking down on the lower end of the pivoted spring-pressed post seen in Figs. 19 and 20 and showing the means of tightening the tension of the spring. Fig. 22, Sheet 5, is an edge view of a form of cam shown in perspective in Fig. 23, Sheet 6. In the drop view, Fig. 22, is shown a section of a splint-carrying bar in the relation it sustains to the cam in the act of being turned thereby. Fig. 24 shows still another shape of cam operating like the two preceding to turn the splint-bars, but differing in construction according to its location and relation to the pins on the said bars when in vertical position. All these cams are fixed on the main frame along the path of the endless carrier, and each gives a quarter-turn to the splint-bars. Fig. 25 is a cross-section of one side of the machine, looking in the direction of movement and showing straightening mechanism for the splints when in vertical position, as seen near the center of the view. This mechanism occurs after the second set of hoppers and before the composition is applied. Fig. 26 shows a cross-section of main frame broken away to narrow the view, a depression at either side of the central carrier-rail to make room for the operation of the carrier and splints. Fig. 27, Sheet 11, is a side elevation of the part of the machine shown in cross-section in Fig. 25, disclosing the driving-gear for the straightening mechanism and showing below a section of the longitudinal power-shaft, which shaft extends the whole length of the machine, Fig. 1, and furnishes the power from which all the mechanism is driven. Fig. 28, Sheet 12, is a cross-section of one of the composition-vats, showing the stirrer therein, the composition-carrying wheels, and other features. Fig. 29, Sheet 13, is a vertical longitudinal section of a composition vat or chamber, showing the roller and stirrer and the hot-water chamber for keeping the composition warm. Fig. 30, Sheet 13, is a section of one side of the composition-vat, showing lugs for supporting the left-hand bearings of the shafts therein; and Figs. 31 and 32 are side views of the bearings for said shafts. Fig. 33, Sheet 8, is a view of one of the unlocking-catches which engages a locking-lever in the splint-bars after the bars have passed on the table in front of the saws and releases the splints in the bar. Two sets of these catches occur, one before each set of saws, as seen in Fig. 34, Sheet 14. This latter figure (34) is a plan view of a section of the machine occupied by the splint-severing saws with intervening space in which to reverse the bars before cutting the splints on the other side. Fig. 35 is a side elevation of the part shown in Fig. 34 and showing the inclined ways for conveying the completed matches to the delivery-table. Fig. 36 is a side view of a section of the machine where the finished matches pass off the cutting-table, and Fig. 37 shows one of the bifurcated spring-grasps which engages the splints and carries them down to the packing-box.

A key to the invention is furnished on Sheet 1 of the drawings and is designed to aid in an understanding of the invention preliminary to the general description, whereby said description will be rendered more intelligible. In this key we have illustrated the order of parts and movements in separate and distinct views numbered to correspond to like numbers in the several views. It will be observed in the key that the splint-bar is the conspicuous feature of the invention, and that the other features in arrangement and construction are largely tributary to this central and leading element. Remembering now that an endless chain of splint-bars held in links travels over the sprocket-wheels at the ends of the machine and over the drying-frame (seen in Fig. 1) and that these bars are constantly changing position rotarily, first to fill with splints, next to even their ends, next to dip in composition, and so on through all the steps to the end, a clear idea of the nature and operation of the machine will be obtained. How these functions are performed will clearly appear from the following brief description of the key, viz:

1 k   Cams in front first hoppers to turn any bars that may have gotten into wrong position.
2 k   First set of hoppers and filling upper side of bar.
3 k   Passing from under hopper and locking the splints.
4 k   When the link has passed by the locking-catch, the forward pin strikes second set of cams, turning the splints vertical.
5 k   The link then moves on and engages third set of cams—
6 k   thus turning the splint-bar empty side up, ready to pass under the second set of hoppers.
7 k   When filled on this side, the link passes from under, engaging another set of locking-catches. Now both sides of the bar are filled with splints, lying in horizontal position and locked.
8 k   As the link moves along, the forward pin at its side strikes turning-cams, thus setting the splints on end ready to pass between—
9 k   the straightening-plates, which have a longitudinal movement the same speed as the links, and come into position once for each link that passes. The links pass out from between the straightener on end—

10 k  yet of course staying so until passing over the first set of composition rollers—

11 k  whose speed is the same as that of the links. After passing over the first set of rollers the chain moves along until the composition "sets." Then the link engages the—

12 k  next set of cams, turning the splints horizontal. Then engagement is had with the—

13 k  next set of cams, which stand the splints on reverse end, the undipped end being down. Now the—

14 k  second set of composition rollers (duplicates of first set)—

15 k  and far enough along to allow the composition to have set—

16 k  come into action, and engagement is had with the succeeding set of cams and the bars are turned.

17 k  After position the chain moves up and down through the drying-room, Fig. 1, until the composition is thoroughly dry. The links then come along to the cutting-tables, riding flatly upon the same. There they engage the—

18 k  first set of unlocking-catches, and the links move over the first set of—

19 k  saws, which sever the splints in their middle. At this time a bifurcated spring engages the splints from above and leads them down to the packing-box. As the link passes on it engages the—

20 k  next set of cams, then the—

21 k  succeeding set to make a complete turn, and then—

22 k  second set of unlocking-catches and to—

23 k  second set of saws, also provided with guideways leading to the packing-boxes by means of bifurcated guide-springs. Finally, the chain passes around end sprocket-wheel—

24 k  back to the commencing-point empty, and is ready to repeat the operation above described.

The invention is of the endless carrier variety, and the carrier passes over two sprocket-wheels 2 and 3, Fig. 1, one at each end of the machine, and is otherwise supported between its ends on a central track or guide rail 4, Sheet 3, Figs. 36 37, resting in the main on standards or uprights 5, at intervals and furnishing a support for both the upper and lower sets of rails. These rails have a groove in their top for an enlarged portion of the carrier-links to travel in, so that the rails serve as supports and guides for the carrier or endless chain and keep the carrier always in the proper relation to the other parts.

The carrier-chain consists of a series of links, as seen in Fig. 5, Sheet 4. Each link has a pair of parallel bars 6 and cross-bars 7 at each end rigid with the bars 6 and forming a frame or link. Centrally on one cross-bar is a strong hook 8, Fig. 12, Sheet 5, which engages a round shank on the next link corresponding to shank 9. (Shown in Fig. 5.) The width and depth of the hook and shank on the links correspond to the groove in the carrying-rail 4, and form the enlargement referred to as traveling in said groove. Of course this exact construction of link-frame need not be closely followed, and its construction can be modified considerably and still be within the scope of the invention. The splint-carrying bars 10, Sheet 4, are held by these links, said bars being independently journaled in the ends of the cross-bars 7. Each splint-bar is the duplicate of the others, except that some are equipped to turn to the right and others to the left, as we shall see farther on. In other respects all are alike. Each bar, as here shown, has a central core 11 and toothed plates 12 at opposite sides, screwed rigidly to the core. The teeth 13 on these plates extend beyond the surface of the core, and have notches, Figs. 8 and 11, between them inclined in the direction of travel, so as to aid in holding the match-splints. The notches in the respective plates are opposite one another, and are just large enough for a single splint to readily drop therein and be locked.

The means of locking consist in two toothed plates 14, set, respectively, in longitudinal rabbets in the core, Fig. 10, within the outer plates 12 and free to slide therein. The said locking-plates 14 have teeth shaped as seen in Figs. 8 and 11, the projecting points of which are set reversely to the inclination of the notches in plate 12 and are designed to engage the match-splints and hold them firmly in said notches when the said plates 14 are moved up to locking position, Fig. 11. Each locking-plate is provided with a separate lever 15, which passes transversely through a slot in the bar and in the locking-plate, and is pivoted at 16, Fig. 6, at one side of the center to exert the requisite movement on the said locking-plate when moved in either direction. The two levers 15 are arranged one above the other and each operates only one of the locking-plates, as we shall see farther on. When the plates 14 are in unlocked position, the width of the teeth 13 is sufficient to cover the teeth on said plates and leave the notches free to load or unload, as may be required. The links thus constructed are united one to the other and form the endless carrier or chain which conveys the splints through the machine. In practice each link is near about thirteen inches in length and, say, nine inches in width. The size of the splint-bars in cross-section is shown in Figs. 9 and 10. Now, having learned the construction and support of the endless carrier and seen that its movement is regular and continuous by reason of the power applied to both the sprocket-wheels 2 3 from the longitudinal power-shaft 17, Figs.

1 and 2, which shaft supplies power to the entire machine, we pass next to the manner of feeding the splints to the toothed holding-bars. This operation is shown clearly in Fig. 12, Sheet 5, where we have a longitudinal section of one of the four feed-hoppers 18 and 19, arranged in pairs, Fig. 2, and constructed and operating alike.

The splints, full length or double the length of a match, are placed loosely in the hoppers and feed mainly by gravity into the carrying-bars. An equalizing-roller 20 at the front of the hopper is revolved in a reverse direction to the movement of the carrier by a shaft 21, Fig. 2, having a pinion 22, operated by a gear-wheel 23 on a shaft 24, crossing in rear of the hopper. This latter shaft is driven by a crossed belt from the main counter-shaft. Obviously the manner of transmitting motion to these parts is not specially important and need not be minutely described. Any suitable or sufficient arrangement of gearing, belting, or the like to convey power of any of the parts would suffice and may be adopted. The equalizing-roller serves to keep the bulk of the splints back from falling *en masse* upon the carrier, prevents the splints from wedging or locking in the bottom of the hopper, and assists in keeping them straight and in feeding into the bars. In this operation there is also more or less easy agitation of the splints, which facilitates their feeding into the bar-notches. In addition to this roller, at the rear of the hopper, is a shouldered agitator 25, which has a limited vertical reciprocating movement in guides, and is actuated by eccentric 26 on the main hopper-shaft 24. Connected with this eccentric, Fig. 4, Sheet 3, is a rod 27, pivotally connected with the back of said agitator 25, through which its up-and-down movement is effected.

At the bottom of the hopper are side ledges 28, Fig. 13, Sheet 7, Fig. 14, Sheet 8, supporting the ends of the splints and leaving the intervening space exposed for the passage and action of the splint-bars, the notched plates of which come slightly above the bearing-surfaces of the said ledges and catch the splints as they move along. The splints thus get all the agitation they require to feed into the carrying-bars, and each set of notches is supposed to take in one splint as it passes beneath the hopper until that side of the bar is loaded after the manner shown in Fig. 12. The two bars in each link are filled at the same time from their respective hoppers.

The hoppers in each set are separated a short distance from each other by sleeves 29, Sheet 7, Fig. 13, on tie-rods 30, connecting the hoppers. The center of the links passes centrally between the hoppers, and mounted upon the lower tie-rod sleeve is an idle-roller 31, Fig. 16, Sheet 9, Fig. 13, Sheet 7, which treads upon the central parallel body-bars 6 of the links as they successively pass along, and serves to keep each link in its place upon the track-rail 4, provided for its support. This serves incidentally to bring all the splint-bars in the same relation exactly to the hoppers and in the proper position to load as they pass. The splint-bars having been loaded on one side, they pass a short distance beyond the hopper, when they come in contact with the first set of locking-catches 32, Fig. 2, Sheet 2, Figs. 19 and 20, Sheet 6. These catches have spring-pressed spindles 33 set in the main frame, which allow a pivotal movement and give pressure enough to the levers 15 in the splint-bars to close the toothed locking-plates on the splints and at the same time permit the catch to yield for the passage of the bar and its lever. The tension of the spring can be increased or lessened in the manner shown in Fig. 21, or in any other suitable way. The locking of the splints having been accomplished, the bars on the link so locked are ready to be inverted to fill the other side. This inversion is accomplished in two quarter-turns by two sets of cams 34 and 35 in close succession. The shape of the first of these cams or sets of cams is shown in Fig. 23, Sheet 6, and is adapted to make up the first quarter-turn of the splint-bars by bearing against the lateral pins 36, Figs. 6 and 9, Sheet 4, when they are in horizontal position. These pins project laterally from the forward end of each splint-bar, one from each side in different planes, according as one side or the other of the bar is up or down. Thus, in Fig. 6, if the bar move forward to the right and the outer pin 36 strikes the first turning-cam in order 34, the bar will be turned round a quarter-turn and the pin 34 caused to stand vertical. The cam alone may not completely to do this, and so I have provided a spring-pressed push-bolt and holder 37, Figs. 6 and 10, which will complete the turning after the bar revolves to a certain position and will stop and hold it when the quarter-turn is made. The splint-bar has flat surfaces at its ends where the bolt bears against it and is of uniform cross-section at this point.

Cams 35 are adapted to give the second quarter-turn necessary to the complete inversion of the bar and are shaped to suit the position and relation the pins 35 now sustain to the frame on which the cams are fixed. Any shape of cam that will do the work may be employed. The splint-bars are now inverted ready to pass beneath the next set of hoppers and be filled on the other side. This brings us to the second set of hoppers 19, which are identical in construction and operation to hoppers 18, already described, and the parts in these sets of hoppers are interchangeable.

Proceeding in order from hoppers 6 the first succeeding operation is to lock the splint-bars which occurs, as before described, by the locking-catches 32 on the main frame bearing against the levers 15 in the splint-bars. Both sides of the splint-bars are now filled and locked, and the next step, preparatory to tipping the ends with the combustible compound, is to straighten or even the splints with respect to one another and the mechanism through which they are to pass. Just before this occurs, however, the splints are turned into vertical position by giving the carrying-bars a quarter-turn, cams 34 serving to make this turn. It will be understood that cams 34 and 35 or their equivalent recur at intervals all along the line or path of the splint-carriers wherever turning of the bars is required.

The straightening mechanism is seen most clearly on Sheets 10 and 11, Figs. 25 and 27. In these figures are shown two sets of crank-shafts 28, supported on the main frame, one set above and the other below the plane of the splint-carriers. These crank-shafts are operated by a train of gear proceeding from the main power-shaft, Fig. 27, and so constructed and connected that all four of the shafts have exactly equal rotary movements. This is effected by making all the gear-wheels of the respective shafts alike in size. The train of gear runs from a main driver 39 to the first crank-gear 40, which meshes with an intermediate gear to the corresponding crank-gear 40 below. Directly above gear 41 is another intermediate gear 42, which meshes with both the upper crank-gears 40. Thus the respective cranks in both sets are made to travel uniformly together, and the gear being properly disposed to start with, so that the cranks will move toward and from each other in certain fixed planes, they will continue to operate that without change. Then to complete the straightening mechanism both upper and lower sets of cranks are connected by straightening-plates 43, which have standards 44 fixed rigidly to said plates and provided with bearings working on the cranks. The straightening-plates approach and leave each other in parallel horizontal planes, and the mechanism is so planned and arranged that when at their nearest approach to one another they will have just the length of the splints between them, while at the same time they move forward at exactly the same rate of speed as the splints, so that there will be entire harmony in the movements. This mechanism is further so timed and arranged that the straightening-plates make their nearest approach once for each link of the carrier and while the link comes within their borders, so that all the splints of both carrier-bars shall be exposed to the straightening process at the same time and to exactly the same degree. The straightening being thus effected, the splints are ready for the compound, Sheets 12 and 13, Figs. 28 and 29. The splints remain in vertical position as they pass through the dipping process the same as they come from the straightener.

The composition mechanism consists primarily in a vat 45, set into a heating-chamber 46, which is filled with hot water to keep the composition in the vat in a liquid position. A steam-jacket would answer the same purpose. In the lower part of the vat is a stirrer 47, operated by gear from the axle of the composition-rolls 49. These rolls have the shape of ordinary band-wheels with flat surfaces and serve to carry up sufficient of the composition to dip the splints with the requisite quantity thereof. This dipping occurs by moving the endless carrier over the composition-rolls, as seen in Fig. 28, one end of the splints in each bar coming practically in contact with the surface of one of the rolls and carrying off such quantity of the composition as will adhere to each splint. Of course the consistency of the composition in the vat is maintained at the proper point, so that each splint will be tipped or dipped with enough of the material, and substantial uniformity will be obtained in its distribution on the splints of each bar and all the bars.

The composition-distributing rolls are driven by gear-connections with the main-line shaft heretofore described and at the same rate of speed as the endless carrier, so that there will be no strain on the splints or any part of the mechanism by reason of this momentary contact. The carrier moves in the guide 4 intermediate of its sides, which supports and centers it here and elsewhere in the line of its movement. A scraper 50 removes the adhesive composition from the rolls after they pass beyond the splints, so that fresh composition will be constantly supplied. Thus we have the splints of each rapidly-succeeding set of carriers dipped at one end, and the next step in the process is to set or measurably dry the compound they carry before attempting anything further. Otherwise the composition would run, which must be avoided. The splints are therefore maintained with dipped end downward until the setting of material occurs, and the material being of a character that sets rapidly it will harden sufficiently to go ahead with the process in traveling, say, longitudinally to thirty feet or thereabout. This done, the splints are ready to pass to the next set of composition-rolls to be dipped at the opposite end. First, however, they must be reversed, as the dipped ends are still down, and the two sets of cams 34 and 35 come successively into play, as before described, each giving a quarter-turn to the carriers.

The dipping mechanism is the same here as in the first instance and the operation the same, so that when the reverse end of the splint is loaded with composition this part of the process is finished and the thorough drying of the material on the splints is necessary. For this purpose I employ a drying-house 51 in the line of the machine and a part thereof. To economize space and to do the work as quickly as practicable, I lead the endless carrier up and down over sprocket-wheels 52, arranged on two elevations on a frame in the drying-room, where the temperature is such as to accomplish the drying of the composition by the time the carrier passes out again upon the main frame; but before entering the drying-room the splint-carriers successively are turned to a horizontal position by suitably-arranged cams 34. Both ends of the splints are now coated with composition, dried, and ready for use, and it only remains to sever the splints at the center to convert them into finished matches. Hence after leaving the drying-room the carrier passes over a cutting or severing table 53, Sheet 14, centrally between the sides of which is a saw 54, one for each line of splint-carrying bars. Before this occurs, however, the splints on the lower side of the bars must be unlocked. Hence we have placed unlocking projections 55, similar substantially to the locking-catches 32, on the frame in line with the lower locking-lever 15 of each splint-bar. When the splints are locked, the catch 15 engages the locking-lever, which for the time is on top, the top set of teeth being filled. Now the operation of discharge begins from the bottom of the bar, and hence the lower lever is moved. The bars being inverted and the lower lever being engaged by projection 55, it unlocks the toothed locking-plate 14 and liberates the splints, except that they are now held in the notches of the bar by reason of the flat surface of the severing-table, on which the bars and splints slide. The saw is so placed in the frame that its teeth reach just high enough to cut the splints in twain and no higher, and the plates holding the splints stand out a little beyond the sides of the central core of the carrier-bar so that this severing may occur without the teeth striking the core. The saws receive their motion from an elevated countershaft 56, having a band-wheel greater in width than the two band-wheels upon the respective saw-shafts, so as to accommodate both bands, and this large band-wheel receives its power from the main driving-shaft by any suitable gear or belt connection. The saws cut reversely to the direction of the movement of the carrier. Above each saw is a pressure-roller 57 to keep the carriers down upon the table. As the carrier-bars pass over the saws and just at the point of severing, a bifurcated spring 58 engages the sticks or splints from above, one arm of the spring projecting forward by the saw at each side of the carrier-bar and over the splint, as seen in Fig. 37. From this point a sliding guideway 59 extends down to the delivery-table, and the finished matches are crowded along down this way after cutting and leaving the carriers, as seen in Fig. 36. This leaves the reverse sides of the splint-carriers filled and to be discharged, as herein just described, another pair of saws and a duplication of the attendant mechanism occuring a little farther on, the same numbers referring to like parts in said mechanism. Leaving the first saws the respective splint-bars must be inverted before they reach the second set of saws, and this occurs by means of the cams 34 and 60.

Having passed the last saw discharged on both sides, the carrier goes back to the first hopper to be reloaded, and then the operation herein described is repeated, and so on in regular succession. Just in front of the first hopper are cams 60 on either side to turn right side up any carrier-bars that may have gotten wrong on the way back after unloading.

Recurring now to the hopper, Sheet 11, Fig. 17, we see part of a mechanism designed to bridge over the short space at the joining of the links in the endless carrier where no feeding of splints should occur. Ordinarily no feeding would occur anyway but to prevent it absolutely I provide an automatic stop 61, which comes down at the ends of the equalizing-roller, Fig. 16, Sheet 9, on the ledges 28 near their outer ends and shuts off any feeding or dropping out of splints from beneath the roller. It will be remembered that the carrier-notches extend above the ledges 28, so that they may feed directly from the body of splints in the hopper. The stop 61 is attached to a shaft 62, extending across above the endless carrier in front of the hoppers, Fig. 17, Sheet 11, and is connected by a spring-bar with a roller 63, Fig. 2, Sheet 2, which has two diameters at its ends, the smaller diameter treading on the body or central parallel bars 6 of the links and the larger diameter treading on the end cross-bars 7 of the links when the roller crosses the same. The roller 63 is so placed with respect to the other mechanism that when a joint is central beneath the hopper and feeding should be avoided the next preceding joint is in position to cause the roller to ride over it and thus move the stop 61 down into closing position. The stop stays down till the roller crosses the cross-bars of the adjacent ends of the links beneath it, and this of course is as long as it takes the like cross-bars to pass through beneath the hopper when feeding should again begin, and does begin, by the lifting of the stop and the readiness of the succeeding carriers to be loaded. The shaft 62 has an arm 64, with a spring 65, Fig. 17, to facilitate the upward movement of the stop and to keep the roller down on the body-bars, except when it crosses at the link-joints.

On Sheet 13 in Fig. 30 are shown lugs 66 on the inner side of a section of the composition-vat at the left of Fig. 28, Sheet 12, which lugs support the bearings of the stirrer and the roller-shafts—that is, a pair of lugs is provided for each bearing 67 and 68, (shown in Figs. 31 and 32,) and a brace to keep the lower bearing down, and thus overcome any tendency there might be in the stirrer to work upward in the material owing to its density or thickness.

Having thus described our invention, what we claim as new, and desire to secure by Letters Patent, is—

1. In a match-machine, an endless carrier formed of links jointed together, and longitudinal splint-carrying bars pivotally secured in the links at their ends, substantially as set forth.

2. In a match-machine, a carrier consisting of a series of links and longitudinally-arranged splint-bars separately pivoted in each link at the sides thereof, substantially as set forth.

3. In a match-machine, a carrier having links with splint-bars pivoted to turn axially therein and provided with teeth to engage the splints, substantially as set forth.

4. In a match-machine, an endless carrier having links provided with longitudinally-arranged splint-bars, means to turn the bars axially, and means to hold the bars when turned, substantially as set forth.

5. In a match-machine, an endless carrier consisting of links constructed at their center to travel in a guideway and provided with splint-bars, in combination with a guideway for said carrier, substantially as set forth.

6. In a match-machine, two composition-vats provided with suitable distributers, an endless carrier provided with splint-bars, and mechanism to invert said bars in their passage from one composition-vat to the other, substantially as set forth.

7. In a match-machine, severing-tables one after the other, provided with separate cutters, in combination with an endless carrier having splint-carrying bars and mechanism to invert the said bars between the sets of tables, substantially as set forth.

8. In a match-machine, a splint-carrying bar provided with journals at its ends to be rotated axially and having teeth on opposite sides to hold splints on both said sides, substantially as set forth.

9. In a match-machine, a carrier-bar notched transversely and a plate with teeth to lock the splints in said notches, substantially as set forth.

10. In a match-machine, a splint-carrying bar having at its edges a series of projections with intervening notches and a movable tooth-plate with teeth to traverse the notches, substantially as set forth.

11. In a match-machine, a splint-carrying bar having a central core with journals at its end, notches transverse of its axis to hold splints, and a movable locking-plate, substantially as set forth.

12. In a match-machine, a splint-carrying bar having transverse notches on its sides, a locking-plate, and a lever in the bar to move said plate, substantially as set forth.

13. In a match-machine, bars for carrying the match-splints, having journals mounted in links and projections on the sides of said bar to turn the bar, substantially as set forth.

14. In a match-machine, a carrier-bar mounted in a link and having a sliding locking-plate to engage the match-splints, a lever to move said plate, and a device to move the lever, substantially as set forth.

15. In a match-machine, a carrier-link consisting of end cross-bars rigidly connected by a central body-bar provided at its sides with splint-bars, substantially as set forth.

16. In a match-machine, a carrier consisting of links having cross-bars provided with bearings at their ends and splint-carrying bars journaled in said bearings, substantially as set forth.

17. In a match-machine, an endless chain supported to travel in a fixed path and consisting of a series of links having carrier-bars in their sides journaled to turn axially, projections on the sides of said bars, and catches on the frame to engage the projections and turn the bars, substantially as set forth.

18. In a match-machine, an endless carrier chain having splint-bars along its sides supported in transverse bars and having journals on which the bars are rotated, said bars constructed to hold splints transversely of their axis and on opposite sides, and means to turn the bars independently of the links, substantially as set forth.

19. In a match-machine, an endless carrier consisting of links, a fixed guideway on which the carrier travels, and splint-bars at the sides of the links journaled in bearings and free to be separately rotated, substantially as set forth.

20. In a match-machine, an endless carrier composed of links, splint-bars in the links provided with means to hold the splint transversely, lateral projections at the front end of said bars, and devices to bear on said projections and give the bars a quarter-turn, substantially as set forth.

21. In a match-machine, a splint-feeding hopper, an endless chain, and a shut-off to stop the feeding of splints actuated by said chain, substantially as set forth.

22. In a match-machine, a splint-evening device consisting of a pair of horizontal plates supported on crank-shafts, substantially as set forth.

23. In a match-machine, two pairs of crank-shafts and two plates attached to said shafts and adapted to approach each other in horizontal planes, and splint-carrying bars supported midway between said plates, substantially as set forth.

24. In a match-machine, an endless carrier having two separate lines of splint-holding bars on its sides, a guide-track, and transverse bars in the carrier supporting the splint-bars, in combination with two horizontally-supported traveling evening-plates, substantially as set forth.

25. In a match-machine, a pair of evening-plates supported on crank-axles, and gear on each axle and intermediate of said axles of the same size, whereby all the axles are caused to move at the same rate of speed, substantially as set forth.

26. In a match-machine, an endless splint-carrier chain, and mechanism to cause the chain to travel in its circuit, in combination with a pair of evening-plates moving in the same direction as said chain, substantially as set forth.

27. In a match-machine, a frame having a support and guide for a splint-carrier chain, links in said chain having their ends rigidly connected, and splint-bars independently journaled on the sides of said links, a composition-vat, and wheels to convey the composition to the splints, substantially as set forth.

28. In a match-machine, a composition-vat having a revolving wheel with a flat surface to convey material to the splints, a scraper for the wheel, and a series of carrier-bars connected by links and conveyed over said wheel, substantially as set forth.

29. In a match-machine, a splint-severing table provided with a cutter, spring-pressed fingers projecting at the sides of the cutter over the table, and a carrier constructed to convey the splints beneath said fingers, substantially as set forth.

30. In a match-machine, a splint-severing table having a centrally-arranged saw, fingers reaching over the splints above the table, and a guideway through which the severed splints are conducted, substantially as set forth.

Witness our hands to the foregoing specification this 29th day of October, 1889.

MAHLON M. ZELLERS.
JOHN W. DENMEAD.

Witnesses:
GEO. H. MACEY,
E. H. CODDING.